United States Patent
Sohler et al.

(10) Patent No.: US 9,631,720 B2
(45) Date of Patent: Apr. 25, 2017

(54) METHOD FOR REDUCING THE REACTION TIME OF AN AUTOMATIC TRANSMISSION OF A MOTOR VEHICLE

(71) Applicant: ZF Friedrichshafen AG, Friedrichshafen (DE)

(72) Inventors: Michael Sohler, Isny (DE); Thilo Schmidt, Meckenbeuren (DE); Thomas Raab, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 226 days.

(21) Appl. No.: 14/538,167

(22) Filed: Nov. 11, 2014

(65) Prior Publication Data
US 2015/0133265 A1 May 14, 2015

(30) Foreign Application Priority Data
Nov. 11, 2013 (DE) .......................... 10 2013 222 811

(51) Int. Cl.
*F16H 61/02* (2006.01)
*F16H 61/00* (2006.01)
*F02D 17/04* (2006.01)

(52) U.S. Cl.
CPC ..... *F16H 61/0025* (2013.01); *F16H 61/0021* (2013.01); *F02D 17/04* (2013.01); *F16H 2061/0034* (2013.01); *F16H 2312/14* (2013.01); *Y10T 477/688* (2015.01)

(58) Field of Classification Search
CPC .. F16H 6/0009; F16H 6/0025; F16H 2312/14; F16H 61/02
See application file for complete search history.

(56) References Cited

U.S. PATENT DOCUMENTS

2013/0296093 A1* 11/2013 Ross ...................... F16D 25/14
475/127

FOREIGN PATENT DOCUMENTS

| DE | 10 2007 003 923 A1 | 8/2008 |
| DE | 10 2010 020 066 A1 | 11/2011 |
| JP | 2001-41315 | 2/2001 |

OTHER PUBLICATIONS

German Patent Office Search Report Jun. 23, 2014.

* cited by examiner

*Primary Examiner* — Huan Le
(74) *Attorney, Agent, or Firm* — Dority & Manning, P.A.

(57) ABSTRACT

A method is provided for reducing the reaction time of an automatic transmission of a motor vehicle, the vehicle having a hydraulic control unit with a pressure regulator, from an engine stop of an automatic start-stop mechanism. The oil volume that is still present in the hydraulic control unit (HCU) of the transmission prior to the stopping of the internal combustion engine is used for the supply of oil for the actuation of the shifting elements of the transmission upon an engine start.

3 Claims, 1 Drawing Sheet

METHOD FOR REDUCING THE REACTION TIME OF AN AUTOMATIC TRANSMISSION OF A MOTOR VEHICLE

FIELD OF THE INVENTION

The present invention relates to a method for reducing the reaction time of an automatic transmission of a motor vehicle that has a hydraulic control unit with a pressure regulator from an engine stop of the automatic start-stop mechanism.

BACKGROUND

From the state of the art, within the framework of an automatic start-stop mechanism, a known process is to automatically shut down internal combustion engines of motor vehicles in the event of a standstill, for the reduction of fuel consumption and emissions, upon the fulfillment of certain conditions, for example at a traffic light, and to restart such engines when necessary, for example upon actuating the drive pedal or the gear selector of the gearbox.

Thereby, with automatic transmissions, upon an engine start from an engine stop of the automatic start-stop mechanism, it is usually the case that several shifting elements are actuated in a short period of time. Thereby, with hydraulically actuated automatic transmissions, a certain amount of oil volumes must be deployed for the control of the shifting elements in this short period of time. Due to the time required for the necessary oil supply, the reaction time, i.e., the time until the start of the internal combustion engine, is extended, resulting in a loss of comfort.

In order to ensure the necessary oil supply required for the control of the automatic transmission, supplemental oil supply systems are generally used, which disadvantageously results in an increase in manufacturing costs and weight. For example, the transmission oil pump or a supplemental pump can be driven by an electric motor. In addition, an energy storage device in the form of an impulse storage device can be provided, whereas the energy storage device is designed as a spring piston accumulator, which is filled with oil during the operation of the internal combustion engine and stretches a spring that advances back the stored oil quantity into the transmission upon the restart of the internal combustion engine.

In order to minimize the additional costs for the supplemental oil supply systems and also reduce the reaction time, upon an engine start from an engine stop of the automatic start-stop mechanism, as little oil as possible made available by the supplemental oil supply systems should be necessary. Ideally, no supplemental oil supply systems should be required.

DE 10 2010 020 066 A1 shows a method for the operation of an automatic start-stop mechanism for a motor vehicle with an internal combustion engine and an automatic transmission having shifting elements for the adjustment of the gear steps, within the framework of which, upon the fulfillment of specifiable shut-off conditions for the internal combustion engine, a gear step is automatically engaged, which is higher than the first gear step and from which a downshift is possible in the first gear step without the actuation of a shifting element of the automatic transmission, for example through the opening of the valves, whereas the internal combustion engine is automatically switched off after engaging the higher gear step.

Thereby, upon the fulfillment of specifiable restarting conditions, the internal combustion engine is automatically restarted, whereas, immediately after the restart, the first gear step is automatically engaged, preferably by merely opening the valves.

Through the known method, an engine start from an engine stop of the automatic start-stop mechanism is to be carried out without supplemental oil supply systems.

SUMMARY OF THE INVENTION

Objects and advantages of the invention will be set forth in part in the following description, or may be obvious from the description, or may be learned through practice of the invention.

The present invention is subject to the task of specifying a method for reducing the reaction time of an automatic transmission of a motor vehicle, the motor vehicle having a hydraulic control unit with a pressure regulator, from an engine stop of the automatic start-stop mechanism, through which, upon an engine start from an engine stop of the automatic start-stop mechanism, the method requires as little oil as possible made available by the supplemental oil supply systems, by which the start-up readiness from an engine stop of the automatic start-stop mechanism increases.

Thereby, advantageously, the costs for the supplemental oil supply systems can be kept low or eliminated, since their design does not take place on the basis of the overall required oil quantity for the engine start, or because such costs can be eliminated. Preferably, depending on the structural conditions of the respective automatic transmission, the necessity of providing supplemental oil supply systems is also to be eliminated.

This task is solved by the characteristics of the invention described and claimed herein.

Accordingly, a method for reducing the reaction time of an automatic transmission of a motor vehicle from an engine stop of the automatic start-stop mechanism is proposed, within the framework of which the oil volume that is still present in the hydraulic control unit (HCU) of the transmission prior to the stopping of the internal combustion engine, and is usually emptied into the transmission sump when the internal combustion engine is switched off and thus when the transmission oil pump is switched off, is used for the supply of oil for the actuation of the shifting elements of the transmission upon an engine start.

In accordance with the invention, the idling of the hydraulic control unit after an engine stop of the automatic start-stop mechanism is prevented or slowed down through an active control of the pressure regulator of the hydraulic control unit of the transmission in the automatic start-stop mechanism. In this manner, the oil volume of the pressure regulator channel up to the next downstream control element is purposefully included, which, depending on the control system, may be either a control valve or a shifting element directly.

Through the concept in accordance with the invention, the prevention of idling of the hydraulic control unit through an active pressure regulator control reduces the oil volume to be advanced for the carrying out of a gear engagement process for an engine start from an engine stop of the automatic start-stop mechanism, particularly when there are long engine stop phases. In addition, the need for supplemental oil supply systems may be eliminated, depending on the design conditions.

This results in an increase in start-up readiness, i.e., in an improvement in reaction time from an engine stop. In addition, variation in the system pressure build-up is reduced, resulting in an improvement in control quality.

Depending on the type of the pressure regulator, in order to prevent the hydraulic control unit from idling, the ventilation of the pressure regulator can be closed to the transmission oil sump with a corresponding control. In particular, with pressure regulators of the CE type (closed-end), which are designed in such a manner that, in the end position, the supply channel (and not the tank ventilation) is closed, within the framework of the special control in accordance with the invention, the ventilation channel is closed.

With a closed-end pressure regulator, the minimization of the flow of leakage oil is minimized. For a desired minimum pressure, the inlet control edge is closed and the flow of leakage oil from the inlet control edge to the tank edge is thus reduced to nearly zero ml/min. Without the closed-end function, for a minimum pressure requirement, each pressure control valve would feature a maximum leakage between the inlet edge and the tank edge, which would result in a high demand for oil volume in the hydraulic system of the hydraulic pump.

In accordance with an additional form of the invention, to enter into the function of preventing the hydraulic control unit from idling through an active pressure regulator control, the automatic start-stop mechanism must be activated, and the rotational speed of the internal combustion engine must fall below a specified first threshold, whereas the first threshold is selected in such a manner that transmission readiness does not exist at a rotational speed below the threshold. In order to not cause a malfunction in the control of the shifting elements, the control in accordance with the invention of the pressure regulator for the prevention of the idling of the hydraulic control unit may not be active until the system pressure level is so low that no power flow, i.e., no transmission readiness, may occur in the transmission.

To exit from the function of preventing the hydraulic control unit from idling through an active pressure regulator control, the automatic start-stop mechanism must be activated or aborted, and the rotational speed of the internal combustion engine must exceed a specified second threshold. The second threshold is selected in such a manner that transmission readiness exists. In accordance with the invention, the first and second threshold can be the same.

BRIEF DESCRIPTION OF THE DRAWINGS

In the following, the invention is more specifically illustrated as an example on the basis of the attached figures. The following is presented in this.

DETAILED DESCRIPTION

Figure 1:
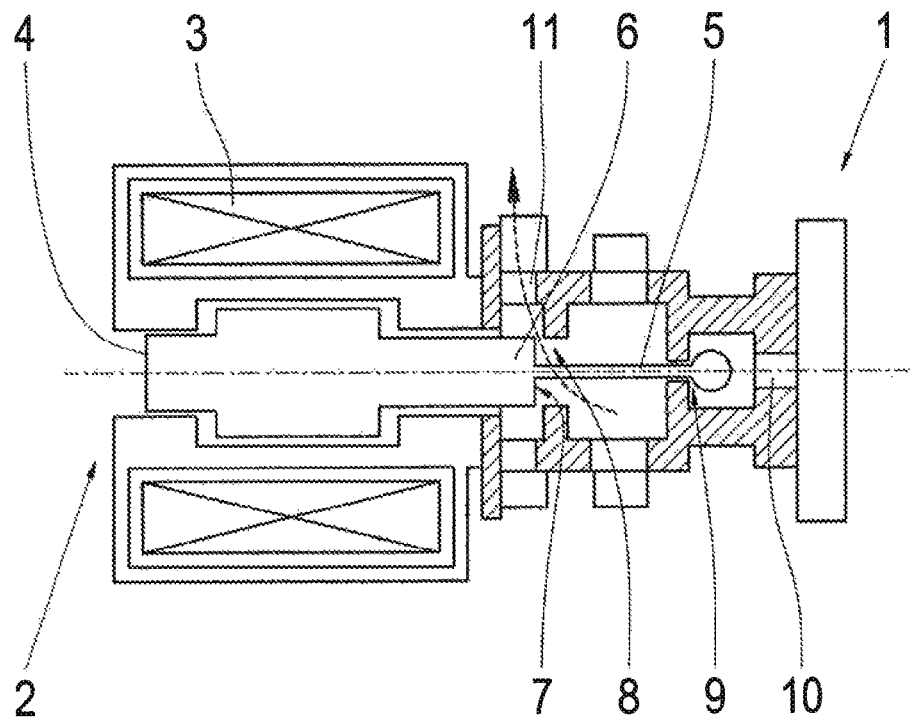
FIG. 1: a pressure regulator of the closed-end type in the starting position after an engine stop of the automatic start-stop mechanism.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

Figure 2:
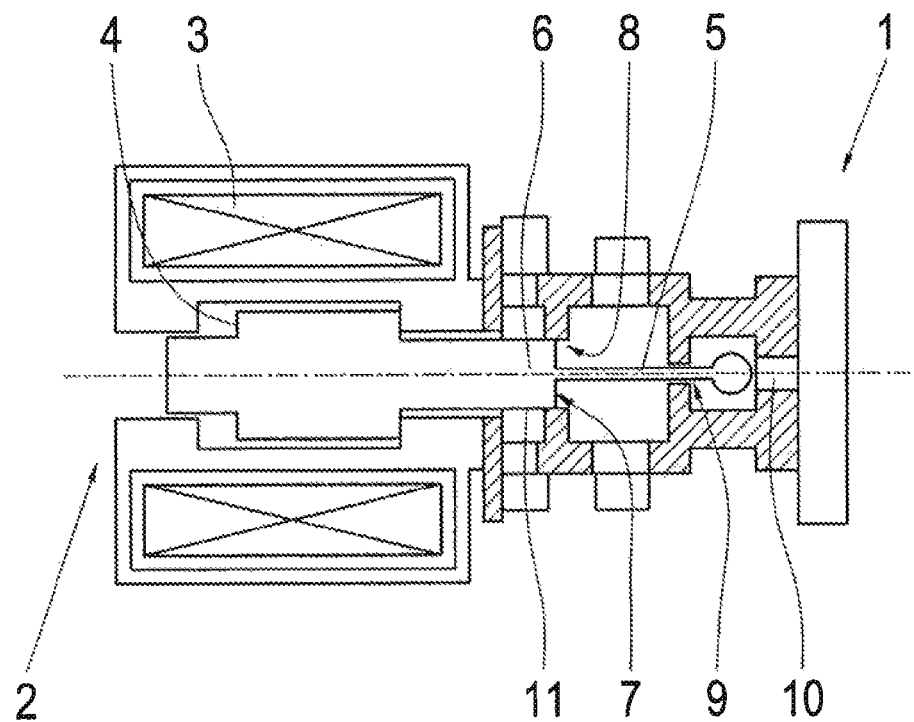
FIG. 2: a pressure regulator of the closed-end type in accordance with the invention for preventing the hydraulic control unit of the transmission from idling.

FIGS. 1 and 2 present a pressure regulator 1 of the closed-end type. It comprises an electromagnet 2 with a magnetic coil 3 and a magnetic anchor 4, as well as an actuating part 5 for a locking part 6 that is axially movable by the magnetic anchor 4, and has a flat seat 7, by which an opening 8 can be closed. In the example shown, the opening 8 leads to the ventilation channel of the pressure regulator 1. In FIGS. 1 and 2, a ball seat is designated with 9, whereas the inlet opening for the supply pressure is designated with 10.

FIG. 1 shows the pressure regulator in the position after an engine stop of the automatic start-stop mechanism in accordance with the state of the art. As can be seen in FIG. 1, the ventilation channel 11 is open, such that oil present in the hydraulic control unit at the point in time of the engine stop can flow to the transmission oil sump.

In accordance with the invention and with reference to FIG. 2, if the start-stop function is activated and the rotational speed of the internal combustion engine falls belong a specified threshold, the pressure regulator 1 is controlled in such a manner that the ventilation channel 11 is closed, whereas, for this purpose, the locking part 6 comes up to a stop at the flat seat 7. In this manner, the prevention of the hydraulic control unit from idling is achieved, such that the reaction time of an automatic transmission of a motor vehicle from an engine stop of the automatic start-stop mechanism is significantly reduced.

Modifications and variations can be made to the embodiments illustrated or described herein without departing from the scope and spirit of the invention as set forth in the appended claims.

The invention claimed is:

1. A method for reducing reaction time of a motor vehicle automatic transmission for an engine restart from an engine stop, wherein the engine restart and the engine stop are initiated by an automatic start-stop mechanism, and wherein the automatic transmission includes a hydraulic control unit (HCU) with a pressure regulator, the method comprising:
   using a volume of oil used in the HCU prior to stopping the engine for actuation of shifting elements in the transmission upon the restart of the engine; and
   preventing or reducing idling of the HCU after the engine stop by active control of the pressure regulator to preserve the volume of oil present in the HCU prior to stopping the engine, wherein active control of the pressure regulator is initiated upon activation of the automatic start-stop mechanism and rotational speed of the engine falling below a first threshold value that is specified such that system pressure is so low that no power flow in the transmission can occur.

2. The method as in claim 1, wherein to exit from prevention of idling of the HCU by active control of the pressure regulator, activation of the automatic start-stop mechanism is aborted and the rotational speed of the engine must exceed a second threshold value that is specified such that system pressure is sufficiently high for power flow in the transmission to occur.

3. The method as in claim 1, wherein the pressure regulator is a closed-end type or pressure regulator, and a ventilation channel in the pressure regulator is closed for prevention of idling of the HCU by active control of the pressure regulator.

* * * * *